July 14, 1925.

G. ULLRICH 1,546,330

PROCESS AND APPARATUS FOR DISINTEGRATING AND FINELY GRINDING HARD AND SOFT SUBSTANCES

Filed April 16, 1923    3 Sheets-Sheet 1

Inventor:
George Ullrich
By: Knight Bros.
attys

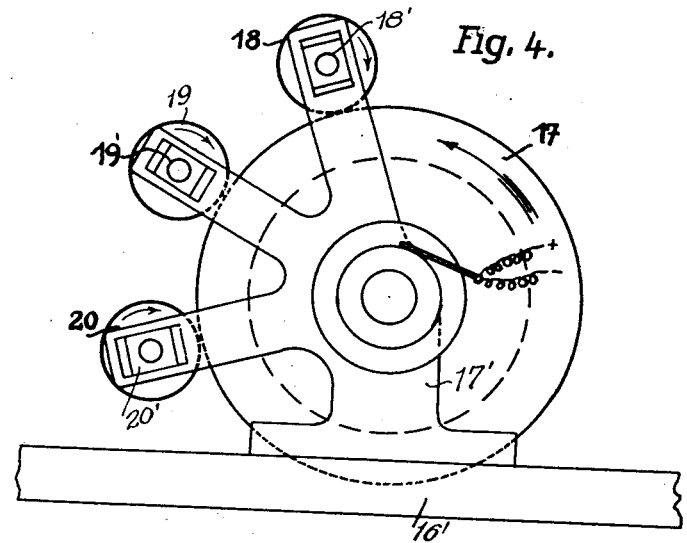
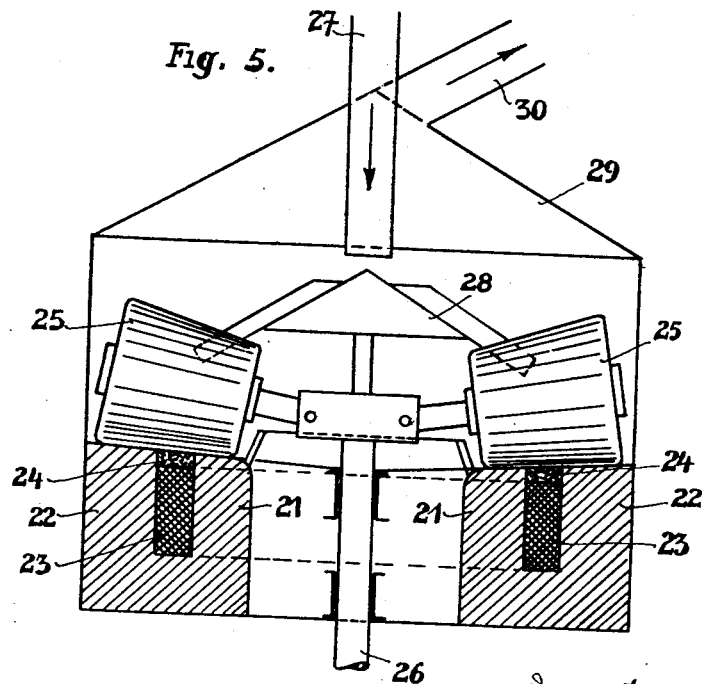

July 14, 1925.
G. ULLRICH
1,546,330
PROCESS AND APPARATUS FOR DISINTEGRATING AND FINELY
GRINDING HARD AND SOFT SUBSTANCES
Filed April 16, 1923     3 Sheets-Sheet 3
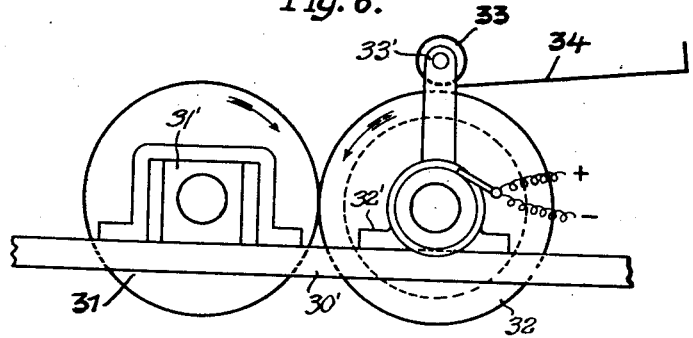
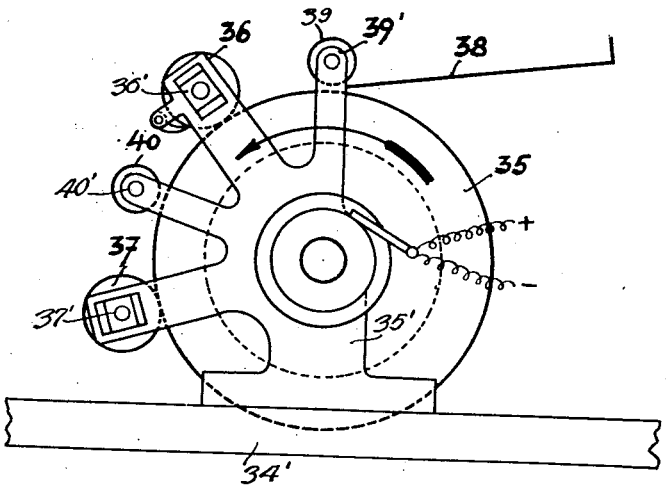

Patented July 14, 1925.

1,546,330

UNITED STATES PATENT OFFICE.

GEORG ULLRICH, OF MAGDEBURG, GERMANY, ASSIGNOR TO THE FIRM FRIED. KRUPP GRUSONWERK AKTIENGESELLSCHAFT, OF MAGDEBURG-BUCKAU, GERMANY.

PROCESS AND APPARATUS FOR DISINTEGRATING AND FINELY GRINDING HARD AND SOFT SUBSTANCES.

Application filed April 16, 1923. Serial No. 632,478.

*To all whom it may concern:*

Be it known that I, GEORG ULLRICH, engineer, citizen of the German Republic, residing at Nr. 2 Winterfeldstrasse, Magdeburg, Germany, has invented certain new and useful Improvements in Processes and Apparatus for Disintegrating and Finely Grinding Hard and Soft Substances, of which the following is a specification.

In the grinding processes hitherto known the machines used therefor such for example as roller mills, oscillating mills, ball mills, tube mills and the like necessitate an expenditure of power which is high in proportion to the output obtained, partly owing to the high pressures on the bearings and partly owing to the great weight of the masses themselves which have to be moved.

The present invention enables the pressures on the bearings to be considerably reduced and smaller moving masses to be employed with the same output, and such results are obtained not so much by disintegrating, finely grinding, squeezing out or pressing out the material to be treated by the weight of the devices acting thereon as by so acting upon it by causing the frictional grinding or crushing surfaces or their supports or carriers to be magnetized and consequently producing the pressure necessary for the treatment of the material to be operated upon by their magnetic attraction of each other. A very high pressure can be produced between the operative surfaces by mutual magnetic attraction. This enables tools much lighter than those hitherto employed to be used. Owing to the lighter weight of these tools and the fact that the pressure which produces the grinding action, as for example the pressure produced magnetically between the rollers in the case of roller mills, is not transmitted to the bearings of the mill and its frame, these machines can be constructed much more lightly than heretofore for the same output.

A further advantage secured by the use of the new process is that the working pressure necessary in each particular case can be regulated by a greater or less supply of current for the magnet windings.

The apparatus necessary for carrying out the new process may consist either wholly or partially of magnetizable material which may for example be present only on their operative surfaces or only in their interiors. The process can be carried out when the material to be treated is to be squeezed and pressed, not only between surfaces which travel over each other but also between surfaces which move towards each other.

The new process affords special advantages when magnetic grinding surfaces are used, as for example in the case of roller mills when grinding materials which contain both magnetic and non-magnetic substances. It is a well known phenomenon, particularly in the case of grinding hard substances such as many ores for example, that in process of time furrows are formed in the grinding surfaces between which furrows ridges are left. This formation of the grinding surfaces is prejudicial to good grinding, and hitherto it has only been possible to correct this defect by renovation of the grinding surfaces which involved great loss of time and expenditure of money. When the new process is employed these inequalities are removed automatically and immediately they are formed by reason of the magnetic particles of the ore being mainly attracted to these ridges and disintegrated there, because there is a greater concentration of the lines of force at these points than there is in the furrows. There is consequently also a greater amount of wear on the grinding surfaces at these ridges than there is in the hollows, so that an automatic and continuous equalization of the grinding surfaces is obtained.

In the treatment of materials in which magnetic substances are present, such substances are drawn in between the grinding devices and also carry the non-magnetic constituents in with them. The whole of the material is therefore held much more firmly than it would be between non-magnetic grinding devices.

Another and very considerable advantage is that in the treatment of materials containing magnetizable substances in roller mills for example, one or more rollers can also be used simultaneously for separating the ground material according to its permeability. As the non-magnetic ground material falls away from the rollers quickly while the magnetic material on the contrary adheres thereto for a longer time, the magnetic material will fall separately from the non-magnetic and can be removed separately therefrom as in the well known magnetic separators.

The process can also be used for squeezing and pressing out parts of plants and the like in order to make them more suitable for feeding purposes or other treatment or to remove or obtain liquids therefrom.

Machines of various kinds can be employed for carrying out the process and several suitable forms are illustrated in the drawings in which, Figs. 1 and 2 show diagrammatically in elevation and in plan, respectively, a roller mill for carrying out the process;

Fig. 4 shows a variation of the structure according to Fig. 1;

Fig. 5 shows a constructional form in which the magnetic field is formed by ring poles; and, Figs. 6 and 7 the combination of magnetic separator means with the grinding device according to the present invention.

Figure 1:
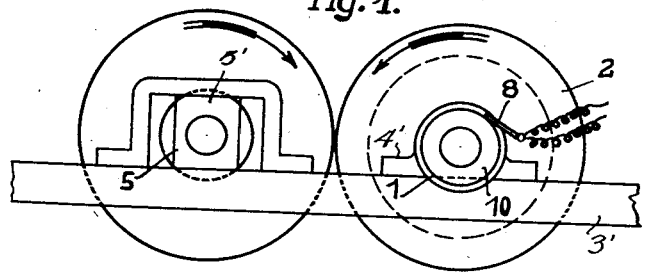
Figure 2:
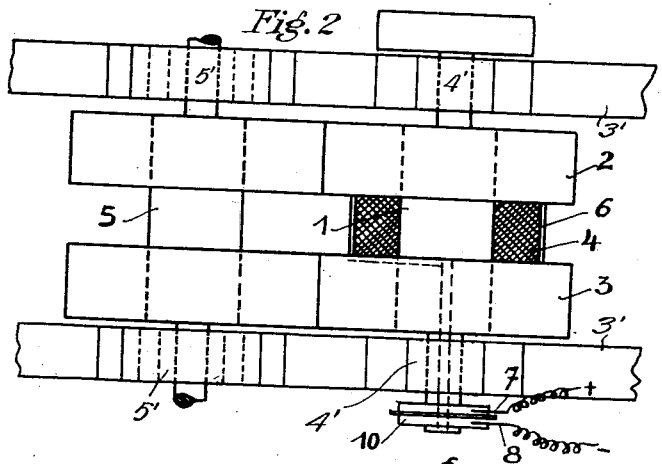

Figures 1 and 2 show diagrammaticaly in elevation and in plan a roller mill suitable for the purpose. The shaft 1 is provided with two rollers 2 and 3 between which the exciting coil 4 which rotates with the shaft is mounted, so that these two rollers form the pole of an electromagnet which has its armature the shaft 5.

Between the rollers of the shaft 5 may be also mounted a coil. This not absolutely necessary except in cases where the number of turns of wire required for the production of the magnetic field cannot be placed between the rollers of the shaft 1 alone. The exciting coil 4 is protected by the guard ring against injury. The current is supplied thereto by the brushes 7 and 8 and the slip rings 9 and 10. The external surfaces of the rollers act as grinding surfaces between which the material is fed. The grinding is effected under the great pressure with which the two rollers are mutually drawn together. To permit this mutual drawing together of the rolls one of them at least must be slideably mounted. Accordingly, as shown in the drawings (Figs. 1 and 2) the main roll is journaled in fixed bearings 4' of the frame 3' while auxiliary roll 5 is journaled in a slideable bearing 5' whereby the movement of this roll in a radial direction relative to the roll 2 is permitted. In this way the important advantage is secured in comparison with ordinary roller mills that the working pressure is not transmitted to the bearings of the rollers and the latter have therefore only to support the weight of the rollers. As the production of the working pressure does not depend on the weight of the rollers these may be of less weight than they are in ordinary roller mills. They may also be of smaller diameter if wholly or partially magnetizable material is to be ground, as in this case the magnetic material is drawn between the rollers and the non-magnetic material carried along with it, so that a more powerful bite is obtained with the same diameter of roller than can be obtained with ordinary rollers. The rollers which are pushed on to the cores of the shafts may be held thereon by magnetism and prevented from rotating or moving longitudinally so that they require no special means of attachment for the transmission of power. If necessary the requisite working pressure can also be produced by mechanical means.

Figure 3:
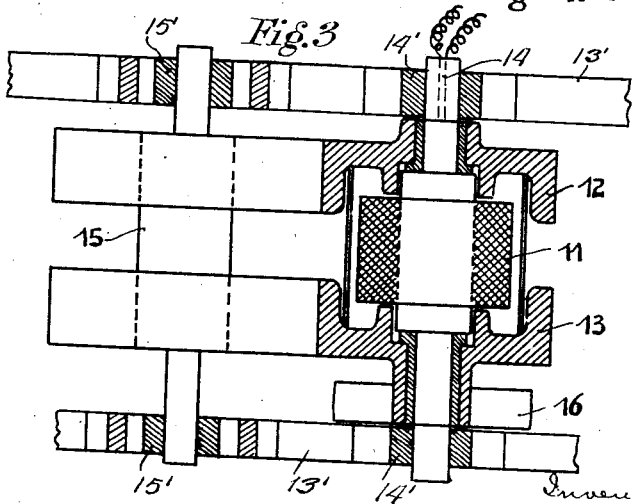
Fig. 3 shows a modified form of magnetic roll.

In the machine according to Figure 3 the exciting coil 11 is stationary and the two magnetized rollers 12 and 13 rotate on the stationary shaft 14.

Similarly to the construction shown in Figs. 1 and 2, the shaft 15 is journaled in the slideable bearings 15', although the shaft 14 is non-rotatable in the bearings 14' of frame 13'. The counter-shaft 15 may either be of the same type of construction as the counter-shaft 5 in Figure 2 or it may be provided with special rotating or stationary exciting coils. The rollers 13 are driven by the belt pulley 16. The rotation is transmitted to the countershaft 15 and the rollers 12 by magnetic power. In Figure 4 is diagrammatically shown another arrangement in which a number of magnetically induced or magnetically excited rollers 18, 19 and 20 run in contact with a magnetically excited roller 17. This ensures the material to be ground passing in succession through a number of grinding points.

The rolls 18, 19 and 20 are respectively journaled in slideable bearings 18', 19' and 20' supported in arms of the pedestal 17' resting on frame 16'. By making the cross sections of the small rollers of different sizes or by exciting these only or exciting them in various strengths pressures of differing strengths can be obtained at the various grinding points. In this case also a well known magnetic field for separating the particles of iron from the ground material may be arranged in front of the first grinding point which is excited by one of the magnetized rollers or by a separate coil.

In some cases it will suffice to provide each of the rollers with only one grinding point, every two rollers forming a pair of poles. A number of rollers may also be each provided with one or two grinding points under each other, the material being fed from each grinding point to the one beneath it, and at the same time the rollers may be so magnetized that the rollers arranged one under the other form alternating poles.

One roller may also be constructed as a hollow roller or ring after the manner of the well known ring mills and inside it one or more magnetically excited or induced rollers may be arranged. In like manner oscillating mills may also be constructed.

The process may also be used in ring or disc-shaped magnetic fields in which for example magnetizable grinding devices travel over the end face or faces of the ring or disc poles. In this case a number of concentric rings may be used which number may be denominated $n$, forming together $n-1$ magnetic fields and travelling over the magnetizable grinding devices. On the other hand ring or disc poles arranged axially or movable relatively to each other can either rub directly on each other or on magnetizable grinding devices interposed between them. In all these arrangements the ring or disc shafts may be horizontal or vertical. Figure 5 shows diagrammatically a constructional form in which the magnetic field is formed by two concentric ring poles 21 and 22 which are excited by the coil 23. This is surrounded by a guard ring 24 of non-magnetic material. On the outer ring surfaces bear conical rollers 25 running on inclined shafts. At the same time the rollers 25 may either rotate round the stationary shaft 26 and the rings may be stationary, or the latter may rotate and the former may be stationary, or the rings and the rollers may rotate relatively to each other. The material is fed in through the tube 27 and guided by the distributor 28 to the grinding path. By means of a cap 29 and a tube 30 the fine material may be drawn out of the grinding chamber by suction. The delivery and removal of the material may however be effected in any other desired manner.

Instead of the two pole rings a larger number thereof may also be used with coils interposed between them and thereby when a number of consecutive poles $n$ are used $(n-1)$ parallel magnetic fields are formed.

The grinding devices may have any desired mode of rotation.

If magnetizable substances are contained in the material to be ground, and if the strength of the magnetizable excitation of the operative devices corresponds both to the pressure necessary for the treatment of the material and the permeability of the magnetizable substances, these will be attracted during treatment by the operative surfaces and consequently, as in the case of roller mills for example, one or both rollers may be used simultaneously for separating the ground material into non-magnetic and magnetic material. If however the disintegration of the magnetizable substances with the other substances does not appear suitable for the purpose because, say, the strength of the excitation of these grinding rollers does not correspond to the permeability of the substances to be separated, or the disintegration of the magnetic substances is not intended but the magnetic excitation of the roller would cause their disintegration, but not their attraction also, separate means for separating these materials will have to be provided. To separate the magnetizable substances magnetizable rollers may be provided which are excited by induction from one of the magnetizable grinding rollers. Such a roller may be arranged in front of the grinding field, or in the case of several such grinding fields in front of the first grinding field, for the separation of substances which are magnetizable but are not to be disintegrated. If however the magnetizable substances are to be disintegrated also the separating roller will be arranged behind the grinding point and in the case of a number of grinding points behind all of them or behind each one of them. If in this case the magnetic excitation of the grinding rollers suffices for grinding but not for the satisfactory excitation of the separating rollers their excitation can be intensified to the required degree by providing additional magnetizing coils on the separating rollers.

Figure 6 shows diagrammatically such an arrangement applied to a roller mill. The separating roller 33 which is excited by induction from the magnetized grinding rollers 31 and 32 is arranged as close as possible to the first one and in such a way that it can take off the substances to be separated from the delivery apparatus 34 and at the same time leave free so much clearance between itself and the grinding roller 32 that the substance which is to be disintegrated can pass freely through this space without being disintegrated by the separating roller. In this case also the grinding rollers or one of them may simultaneously serve for the separation of other disintegrated magnetizable material. Relative movement of the rolls 31 and 32 is permitted by the structure described above, according to which roll 31 is journaled in slideable bearings 31', while roll 32 is supported in fixed bearings 32' of the frame 30'. In order to prevent the roll 33 from acting as a crushing roll it is suitably journaled in a substantially fixed position relative to roll 32 in an extension 33' of the bearing 32'.

Figure 7 shows diagrammatically a grinding apparatus provided with magnetizable grinding rollers and two grinding points of another kind. Around the roller 35 are arranged the rollers 36 and 37 each of which forms a grinding point with the said roller 35. The material to be treated is fed by the delivery apparatus 38 to the grinding point 35—36 after the separating roller 39 excited by induction has taken off from the delivery apparatus the foreign substances, which are magnetizable but are not to be disintegrated. A second separating roller 40 arranged between the grinding rollers 36 and 37 takes disintegrated magnetizable material from the grinding roller. If this second grinding roller be provided with an additional winding which produces a stronger magnetic held between it and the roller 35 than that produced between the rollers 35 and 36, material of a still lower permeability than the material already taken off in the grinding point 35/36 by the roller 36 can also be separated. Roll 35 is supported in bearings provided in pedestals 35′ of the frame 34′. This pedestal is provided with branches or arms 39′ and 40′ in which the separator rolls 39 and 40 are journaled so as to be maintained at a substantially fixed distance from roll 35. Arms alternating with arms 39′ and 40′ support slideable bearings 36′ and 37′ in which are journaled the grinding rolls 36 and 37. In order to prevent a separating action of the grinding rolls scrapers may be provided, as at 38′. In this way it is possible, by providing if necessary a separating roller behind each grinding point and if required additional windings, to separate the ground materials simultaneously with the grinding thereof into several kinds of magnetizable materials of different degrees of permeability. Instead of magnetizing the operative surfaces, or their carriers or supports, the exciting coils can be placed separate from and outside of the rolls, but in such a way that the lines of force pass from one roll to the other.

I claim:

1. Crushing apparatus as described, comprising rotating magnetic crushing rolls arranged for peripheral cooperation, and means for magnetizing said rolls, said rolls being relatively yieldable under the influence of material passed between them.

2. Crushing apparatus as described, comprising a main magnetic crushing roll, a plurality of auxiliary crushing rolls arranged for peripheral cooperation with said main roll, and means for magnetizing said rolls, said auxiliary rolls being relatively yieldable to said main roll under the influence of material passed between said auxiliary rolls and said main roll.

3. Apparatus for grinding and separating magnetic material, comprising a main magnetic roll, two auxiliary magnetic rolls disposed adjacent the periphery of said main roll, means for magnetizing said rolls, one of said auxiliary rolls acting as a grinding roll in cooperation with said main roll, and the other of said auxiliary rolls acting as a magnetic separator roll, the material to be treated being passed between said main roll and said auxiliary rolls, said grinding roll and said main roll being relatively yieldable and said separator roll being maintainable at a substantially constant distance from said main roll.

4. Apparatus for grinding and separating magnetic material, comprising a main magnetic roll, a plurality of auxiliary magnetic rolls disposed adjacent the periphery of said main roll, means for magnetizing said rolls, said auxiliary rolls forming alternate grinding and separating points with said main roll, the rolls forming the grinding rolls in cooperation with said main roll being yieldable relative to the latter, the rolls forming the separator rolls being maintainable at a substantially constant distance, respectively, from said main roll, the material to be treated being passed between said main roll and said auxiliary rolls.

5. Apparatus for grinding and separating magnetic material, comprising a main magnetic roll, a plurality of auxiliary magnetic rolls disposed adjacent the periphery of said main roll, means for magnetizing said rolls, said auxiliary rolls forming alternate grinding and separating points with said main roll, the rolls forming the grinding rolls in cooperation with said main roll being yieldable relative to the latter, the rolls forming the separator rolls being maintainable at a substantially constant distance, respectively, from said main roll, the material to be treated being passed between said main roll and said auxiliary rolls, the strength of the magnetic fields at said separating points increasing progressively.

In testimony whereof the foregoing specification is signed in the presence of two witnesses.

GEORG ULLRICH.

Witnesses:
E. HOLZERMAN,
WILHELM FLEISCHHACK.